United States Patent [19]

Shimizu et al.

[11] Patent Number: 4,562,123

[45] Date of Patent: Dec. 31, 1985

[54] LIQUID FUEL CELL

[75] Inventors: Toshio Shimizu, Katsuta; Takanori Satou; Tsutomu Tsukui, both of Hitachi; Ryouta Doi, Ibaraki; Motoo Yamaguchi, Hitachi, all of Japan

[73] Assignee: Hitachi, Ltd., Tokyo, Japan

[21] Appl. No.: 649,605

[22] Filed: Sep. 12, 1984

[30] Foreign Application Priority Data

Sep. 14, 1983 [JP] Japan ................ 58-168204

[51] Int. Cl.[4] .......................................... H01M 4/00
[52] U.S. Cl. ...................................... 429/27; 429/30; 429/53; 429/72; 429/101
[58] Field of Search ................ 429/27, 28, 29, 53, 429/72, 82, 101, 30

[56] References Cited

U.S. PATENT DOCUMENTS

| | | | |
|---|---|---|---|
| 4,177,327 | 12/1979 | Mathews et al. | 429/27 |
| 4,246,324 | 1/1981 | de Nara et al. | 429/27 X |
| 4,328,291 | 5/1982 | Winsel | 429/27 X |

Primary Examiner—Charles F. LeFevour
Attorney, Agent, or Firm—Antonelli, Terry & Wands

[57] ABSTRACT

In a liquid fuel cell including a plurality of series-connected unit cells each including a fuel electrode and an oxidizer electrode disposed opposite to each other with an electrolyte layer being interposed therebetween, a fuel chamber disposed adjacent to the fuel electrode, and an oxidizer chamber disposed adjacent to the oxidizer electrode, and fuel tanks supplying liquid fuel to the fuel chambers, at least two vertically-spaced passages permitting communication of the fuel tanks with all of the fuel chambers are provided so that one of them serves as a passage for liquid fuel while the other serves as a passage for gas produced at the fuel electrodes, the liquid fuel in an amount smaller than the tank volume is charged in each of the fuel tanks to leave a non-charged space, and gas vent ports provided with gas-liquid separating means are disposed midway of the passages and/or on the tank wall portions corresponding to the non-charged spaces defined in the fuel tanks. The liquid fuel cell can satisfactorily generate power at whatever attitude, and gas produced at the fuel electrodes can be vented to the exterior of the cell without leakage of liquid fuel.

22 Claims, 8 Drawing Figures

LIQUID FUEL CELL

This invention relates to a fuel cell using liquid fuel, and more particularly to a liquid fuel cell of layer-built structure obtained by laminating a plurality of unit cells or single cells in series with each other.

The present invention is suitable for application to a fuel cell in which liquid fuel such as methanol or hydrazine is used together with a gaseous oxidizing agent such as oxygen or air or a liquid oxidizing agent such as hydrogen peroxide.

A fuel cell is a device from which the energy produced as a result of an electrochemical reaction between fuel and an oxidizing agent can be derived directly as electrical energy, and earnest researches and studies are now being made in an attempt to utilize the fuel cell as a unit for generating electrical power, a power source for use in an aircraft or a spacecraft, a power source for use in an unmanned coast or marine equipment, a power source for use in a stationary or mobile radio equipment, a power source for use in an automobile, a power source for driving a household electrical appliance or a power source for driving an electrical appliance for leisure-time amusement.

Fuel cells are broadly typically classified into a molten-carbonate electrolyte type operating at high temperatures of about 500° C.–700° C., a phosphate electrolyte type operating at about 200° C., and an alkaline electrolyte type or an acidic electrolyte type operating at the atmospheric temperature or temperatures lower than about 100° C.

In the molten-carbonate electrolyte type fuel cell or phosphate electrolyte type fuel cell operating at temperatures higher than about 200° C., gaseous fuel such as hydrogen is most frequently used.

On the other hand, in the alkaline electrolyte type fuel cell or acidic electrolyte type fuel cell operating at temperatures lower than about 100° C., liquid fuel such as methanol or hydrazine is most frequently used. Also, in these fuel cells operating at temperatures lower than about 100° C., an aqueous solution of potassium hydroxide or lithium hydroxide or a dilute sulfuric acid is most frequently used as the electrolyte.

In the so-called liquid fuel cell using the liquid fuel such as methanol or hydrazine, gas is produced at the fuel electrode as a result of the electrochemical reaction. When methanol is used as the liquid fuel, carbon dioxide gas is produced, while, when hydrazine is used as the liquid fuel, nitrogen gas is produced.

It is therefore necessary to dispose of the gas produced at the fuel electrode. In the invention disclosed in Japanese Patent Application Laid-open No. 56-97972 (1981) which describes disposal of such a gas, the anolyte which is the mixture of fuel and an electrolyte is supplied to the fuel chambers via the exterior of the fuel cell to be circulated through the above route, so that the gas produced at the fuel electrodes is guided to the exterior of the fuel cell together with the anolyte, and the gas only is separated from the anolyte to be vented to the atmosphere.

In the invention disclosed in Japanese Patent Application Laid-open No. 58-35875 (1983), a gas-liquid separating layer permeable to the produced gas only is disposed in each of the fuel chambers, so that the produced gas can be vented to the exterior of the fuel cell through this gas-liquid separating layers.

Such a manner of gas disposal is effective when the liquid fuel cell assumes always a predetermined attitude. However, the above manner of gas disposal does not provide the fundamental solution of the problem when the liquid fuel cell is used in a different attitude or when its attitude is suddenly changed due to turnover during use.

There is a sufficient possibility of turnover of the liquid fuel cell when the fuel cell is used as a power source for a vacuum sweeper or a lawn mower.

In the former case, a piping system and a pump for circulation of the anolyte are required. Therefore, accidental turnover of the liquid fuel cell may damage the connection between the pump and the piping system, resulting in leakage of the anolyte from the damaged connection or impossibility of operation of the pump.

In the latter case too, connection of a separate fuel tank to the fuel supply port is required for actual operation of the liquid fuel cell. Therefore, similarly, accidental turnover of the fuel cell may also damage the connection between the fuel tank and the fuel supply port, resulting in leakage of the fuel or impossibility of fuel supply. Further, in the latter case, provision of the gas-liquid separating layers in each of the fuel chambers poses such a problem that the contact area between the fuel electrodes and the fuel is decreased, and a considerable proportion of the surface area or the fuel electrodes cannot participate in the electrochemical reaction.

It is therefore an object of the present invention to provide a liquid fuel cell which can operate with a minimized restriction on its artitude during operation.

Another object of the present invention is to provide a liquid fuel cell in which each of the fuel electrodes can make contact with liquid fuel at its entire surface area on the side of the fuel chamber, so that the entirety of the surface area of the fuel electrodes can participate in the electrochemical reaction.

Still another object of the present invention is to provide a quickly startable, liquid fuel cell which can immediately start power generation in response to the supply of an oxidizing agent to its oxidizer chambers.

The present invention is based on the idea that, when gas vent ports, which are permeable to gas only but not permeable to liquid, are provided at an upper position and a lower position respectively of a fuel chamber or a fuel tank, or more preferably, at diagonally upper and lower positions of the fuel chamber or fuel tank, one of the gas vent ports is always located upper relative to the other and can vent the gas produced at the fuel electrode even if the fuel cell might turn over resulting in a change of its attitude.

In the present invention, there are at least two passages connecting between the fuel tank and the fuel chambers. These passages act as fuel passages and act also as gas vent passages for venting gas produced at the fuel electrodes.

These at least two passages are located at such positions that, when one of them acts as the fuel passage, the other acts as the gas vent passage. When the number of the passages is two, they are preferably located at an upper position and a lower position respectively, and it is more preferable that they are located at an upper position and a lower position on a diagonal line.

Each of the at least two passages and/or the fuel tank are provided with gas venting means. This gas venting means may be provided in each of the at least two passages only or may be provided on the fuel tank only. It is needless to mention that the gas venting means may be provided for both of the at least two passages and the fuel tank. The gas venting means provided on the fuel tank is preferably located at such a position that gas produced at the fuel electrodes and discharged into the fuel tank by way of one of the at least two passages can be easily vented to the atmosphere.

When the gas venting means is provided on the fuel tank only, at least two should be provided. They are preferably located at an upper position and a lower position respectively, and it is more preferable that they are located at an upper position and a lower position on a diagonal line.

Each of the gas venting means includes a gas vent port having the function of gas-liquid separation.

Gas accumulating means is provided between the at least two passages and the gas venting means provided in the passages or between the fuel tank and the gas venting means provided on the fuel tank. This gas accumulating means is achieved by arranging so that the area adjacent to and including the associated gas venting means is not filled with liquid fuel. For example, when the fuel tank is provided with the gas venting means, the liquid fuel is not charged to fill the fuel tank but the amount of liquid fuel charged in the fuel tank is smaller than the volume of the fuel tank thereby leaving, in the upper part of the fuel tank, a non-charged space which is not filled with the liquid fuel. Gas accumulates in this space.

Similarly, when each of the passages connecting between the fuel chambers and the fuel tank is provided with the gas venting means, the liquid fuel does not fill the passage acting as the gas vent passage, thereby leaving, in the upper portion of the passage, a non-charged space in which gas can accumulate.

By arranging in the manner above described, gas produced at the fuel electrodes can be vented from one of the gas vent ports to the atmosphere depending on the changed attitude of the fuel cell, so that the fuel cell can satisfactorily operate regardless of its attitude.

Further, by arranging so that one of the at least two passages connecting between the fuel tank and the fuel chambers can supply fuel to the fuel chambers when the attitude of the fuel cell changes over an angle of more than 45°, fuel can be reliably supplied to the fuel chambers at whatever attitude of the fuel cell. Thus, the fuel cell can immediately start power generation or can make quick start in response to the supply of an oxidizing agent to its oxidizer chambers.

Structure of fuel cell

A general structure of a liquid fuel cell is such that a plurality of unit cells, each comprising the combination of a fuel chamber, a fuel electrode, an electrolyte layer, an oxidizer electrode and an oxidizer chamber arranged in the above order, are connected in series to generate a desired voltage. When the electromotive force of the unit cell is 0.6 volts, a series connection of 20 unit cells constitutes a fuel cell generating an electromotive force of 12 volts. Therefore, the individual components should be in the form of planar members each having a smallest possible thickness.

In an embodiment of the liquid fuel cell according to the present invention, a fuel tank is provided at one end or both ends of the series connection of unit cells. This fuel tank may be fixed to the end cell or may be in a detachable cassette form.

The fuel tank has at least two holes for fuel supply, and these holes are disposed in a relation angularly spaced apart by more than 45°, so that liquid fuel can be supplied from one of the holes even when the fuel cell is tilted at an angle of more than 45°.

The fuel cell of the present invention can be used in a state carried on the operator's shoulder, and it is expected that such a mode is most frequent.

In such a case, the fuel cell is tilted at an angle of about 45° or more. It is therefore required that the fuel cell can satisfactorily operate even when it is tilted at an angle of more than 45°. The aforementioned holes are preferably disposed at an upper position and a lower position on a diagonal line. These holes serve also as gas vent passages conducting gas produced at the fuel electrodes toward and into the fuel tank. It is therefore desirable that the level of fuel contained in the fuel tank is kept lower than the position of the upper one of the holes so that the upper hole may not be submerged in the fuel.

It is necessary that the fuel chamber situated near the holes provided on the fuel tank is also provided with holes serving as both fuel supply ports and gas vent passages, so that fuel can be supplied to or gas can be discharged from the fuel chamber through the holes provided on the fuel tank and fuel chamber. The fuel chamber is generally provided by forming a recess in a separator of carbon. It is therefore desirable to bore such holes in the separator.

By the arrangement above described, liquid fuel is supplied to the fuel chambers through the lower one of the holes of the fuel tank, and the fuel chambers are filled with the fuel up to the same level as the fuel level in the fuel tank.

Gas vent ports for venting gas produced at the fuel electrodes to the exterior of the fuel cell can be provided on the fuel chambers or the fuel tank, or midway of the passages connecting between the fuel chambers and the fuel tank, or at a plurality of positions as desired. However, since the indivisual members constituting the unit cells of the fuel cell of layer-built structure should be as thin as possible as described already, the gas vent ports are desirably provided on the fuel tank or midway of the passages connecting between the fuel chambers and the fuel tank.

The gas vent ports are required to be permeable to gas only but impermeable to liquid. As this means, a selectively permeable membrane such as a membrane of a fluoro carbon resin, a membrane of a silicone resin, a cloth subjected to liquid proofing treatment or a non-woven cloth of plastic fibers having a liquid repelling property, as disclosed in Japanese Patent Application Laid-open No. 56-97972 (1981), can be used. Also, the materials used to form the gas-liquid separating layer in Japanese Patent Application Laid-open No. 58-35875 (1983) can be used. However, gas-liquid separating means employed in the present invention should be more carefully selected since the liquid pressure of fuel is also imparted to the gas vent ports. Functions desired for the gas-liquid separating means are that the gas-liquid separating means is free from liquid leakage regardless of impartation of the liquid pressure for a long period of time when it is submerged in the fuel or placed in the fuel-charged part and that the gas-liquid separating means can easily discharge the produced gas without increasing the loss of the gas pressure when it is not submerged in the fuel or placed in the non-charged part. For this purpose, it is preferable to employ a sheet formed by pressing under heat a mass of intertwined fibers of a liquid repellent material. A woven fabric formed of intertwined fiber filaments or a nappy nonwoven cloth is not suitable for use as the gas-liquid separating means. The former material is greatly advantageous over the latter material in that the resistance to permeating gas is low at the same average diameter of the pores.

The gas-liquid separating means having the functions described above are provided on the fuel tank or the fuel chambers or disposed midway of the combined fuel passages and gas vent passages connecting between the fuel tank and the fuel chambers for venting the produced gas therethrough, so that the restrictions on the attitude of the fuel cell during operation can be minimized.

When one fuel tank is disposed on each side of the fuel cell, that is, when a total of two fuel tanks are provided, only one gas vent port may be provided on each fuel tank. In such a case, preferably, the gas vent port is located at an upper position of one of the opposing fuel tanks, and the other gas vent port is located at a lower position of the other fuel tank. It is more preferable that these two gas vent ports are located at diagonal upper and lower positions on the two fuel tanks respectively.

When thus two fuel tanks are provided, it is desirable that fuel tanks having different volumes are combined. In such a case, it is desirable that the volume of the larger fuel tank is more than two times as large as that of the smaller fuel tank. This is because, when the two fuel tanks have the same volume, the greater part of fuel in the upper fuel tank will return into the lower fuel tank when the fuel cell operates in a state in which the fuel cell stands vertical or orthogonal with respect to the laminated direction of the unit cells, resulting in impossibility of operation of the fuel cell or generation of a lower output than that normally provided by the layered unit cells and resulting also in a shortened useful service life of the fuel cell. Employment of the fuel tanks having different volumes is advantageous in that, when the fuel tank having the smaller volume is situated lower than the fuel tank having the larger volume, fuel can be reliably supplied to the upper part of the fuel chambers, so that a high output can be delivered.

Provision of the two fuel tanks exhibits also such an additional effect that gas produced at the fuel electrodes can be more easily discharged from the fuel chambers than when only one fuel tank is provided. Provision of the two fuel tanks exhibits such another effect that dropping of the level of fuel in the fuel chambers with the operation of the fuel cell can be retarded. In order that such effects can be sufficiently exhibited, it is desirable that the volume of the fuel tank having the smaller volume is not smaller than 1/5 of the volume of the fuel tank having the larger volume.

It is desirable to employ an organic high-molecular electrolyte impermeable to the liquid fuel so that the fuel in the fuel chambers may not migrate toward areas except the fuel electrodes and so that the fuel can be continuously supplied to the fuel chambers even when the fuel cell is not in operation. Employment of such an electrolyte is advantageous in that generation of power is immediately started or quick starting can be attained as soon as an oxidizing agent is supplied to the oxidizer chambers.

In the present invention, methanol can be used as the fuel. In this case, methanol may migrate toward and into the electrolyte chambers by permeating through the fuel electrodes and may finally reach the oxidizer electrodes to be oxidized or ignited thereat.

To prevent such an undesirable situation, a separator partition for suppressing permeation of the methanol is preferably interposed between the fuel electrodes and the electrolyte chambers. An example of this separator partition is an ion exchange membrane.

II. Electrolyte

In the liquid fuel cell of the present invention, an acidic or basic electrolyte can be used. A liquid or solid electrolyte can also be used.

However, when a liquid electrolyte is used, the electrolyte which should remain in the electrolyte chambers may pass through the porous fuel electrodes to flow into the fuel chambers due to the dilution phenomenon attributable to the concentration gradient between the electrolyte and the liquid fuel.

To avoid the above phenomenon, a fuel mixture in which the fuel is diluted with the electrolyte (which mixture is generally called an anolyte) is preferably supplied to the fuel chambers. By the supply of the anolyte, the concentration difference between the liquid fuel and the electrolyte can be decreased to minimize flow-out of the electrolyte from the electrolyte chambers toward and into the fuel chambers. However, dilution of the fuel with the electrolyte is an unnecessary countermeasure from the aspect of the primary functions of the fuel cell in that the concentration of the liquid fuel is correspondingly lowered, and power is consumed for circulation of the electrolyte rather than circulation of the fuel, resulting in a reduced efficiency of energy utilization. Further, the supply or circulation of the highly corrosive electrolyte together with the fuel is objectionable to the user in addition to the severe restrictions on the materials constituting the fuel cell.

Employment of a solid electrolyte can solve all of the aforementioned problems encountered with the liquid electrolyte.

It is desirable to employ an organic high-molecular electrolyte such as polystyrene sulfonate as the solid electrolyte.

As an example of the method for forming the organic high-molecular electrolyte layer, an ion exchange membrane is fixed in an electrolyte supporting frame member, and the aforementioned electrolyte composition is supported on one surface or both surfaces of the membrane. According to such a method, the thickness of the electrolyte layer structue can be made very small, and the assemblying of the fuel cell can also be facilitated.

The electrolyte supporting frame member is preferably made of an electrical insulating material and may, for example, be a plate, a sheet or a film of a suitable one of various plastic materials. When a thickener or a spacer is blended in the electrolyte composition, short-circuit between the electrodes can be prevented.

According to another method. the organic high-molecular electrolyte composition described above is supported in a dry state or in a paste form on a frame member having a thickness of 0.1 mm to 5 mm, especially, 0.3 mm to 2 mm, to provide a thin electrolyte layer structure. It is also effective to coat the organic high-molecular electrolyte composition on the opposing surface of the oxidizer electrodes and/or the fuel electrodes.

The solid electrolyte is advantageous over the liquid electrolyte in that the high assembling precision required for a fuel cell using the liquid electrolyte is unnecessary, and there are less restrictions on the materials of the gas-liquid separating means. The solid electrolyte is further advantageous over the liquid electrolyte in that, even when the cell frame is ruptured due to fuel-cell handling failure, for example, accidental drop or impingement with an obstacle, the solid electrolyte would not leak to the exterior of the fuel cell, whereas the liquid electrolyte leaks easily to the exterior of the fuel cell.

The term "solid electrolyte" is used in the present invention to exclude that not containing any liquid components but include also that in which a high-molecular electrolyte is dissolved in water and a thickener is added as required to provide a pasty electrolyte.

III. Fuel chamber

The electrochemical reaction in a fuel cell, for example, a methanol fuel cell is as follows:

Fuel electrode (negative electrode)

$$CH_3OH + H_2O \rightarrow CO_2 + 6H^+ + 6e^-$$

Oxidizer electrode (positive electrode)

$$(3/2)O_2 + 6H^+ + 6e^- \rightarrow 3H_2O$$

In order that the electrochemical reaction described above can effectively proceed at the fuel electrode, it is desirable that the fuel makes continuous contact with the fuel electrode up to the uppermost end of the latter so that the entire surface of the fuel electrode can be utilized for the reaction.

However, a portion which is not in contact with the fuel is left at the upper part of the fuel electrode, since the liquid level in the fuel chamber is the same as that in the fuel tank, and the fuel is not contained in the fuel tank to completely fill the fuel tank. Also, due to progressive consumption of the fuel with the operation of the fuel cell, the contact area between the fuel electrode and the fuel decreases progressively.

In order that the fuel electrode can be charged with the fuel under such a situation, it is effective to provide, in the fuel chamber, a fibrous sucking member capable of sucking the fuel by the capillary action.

As a base material of this sucking member, an organic or inorganic fibrous material such as paper, cotton or asbestos glass, or an synthetic fibrous material such as acrylic fibers, aromatic polyamide fibers, nylon fibers, polyamide-imide fibers, polyester fibers or polypropylene fibers can be used. An acid or alkali resistive material is especially preferable from the aspect of the property of material. When a natural, organic fibrous base material is employed, it is effective to treat or impregnate it with resin varnish. It is needless to mention that the amount of the resin varnish is suitably limited so that the capillary action may not be lost. Besides the fibrous base materials above described, a porous sheet such as a sheet obtained by sintering powder of an inorganic material such as alumina or silica may be employed. In this case, a hydrophilic material is more preferable. However, the inventors have experimentally confirmed that a hydrophobic material can also be used when the fuel is, for example, methanol which shows an affinity to carbon. Although the thickness of the capillary member is not primarily determined but is variable depending on the material and porosity, a value of more than 10 μm is suitable from the viewpoints of strength and anti-swellability.

This method of fuel supply by means of such a sucking member is especially effective when a solid electrolyte is employed. This is because, in a fuel cell using a liquid electrolyte, supply of anolyte to the fuel chambers is required, and the amount of dilute sulfuric acid in the fuel chambers occupies 50 to 70% by volume in the case of an ordinary fuel cell. Because of such a low concentration of methanol, supply of a sufficient amount of fuel up to the uppermost end of the fuel electrodes is difficult according to the sucking mode of fuel supply.

In contrast, in the case where the solid electrolyte is employed, methanol can be supplied to the fuel chambers singly or with water added in a small amount required for the reaction. Therefore, the fuel can be sufficiently supplied up to the uppermost end of the fuel electrodes according to the sucking mode of fuel supply.

Figure 1:
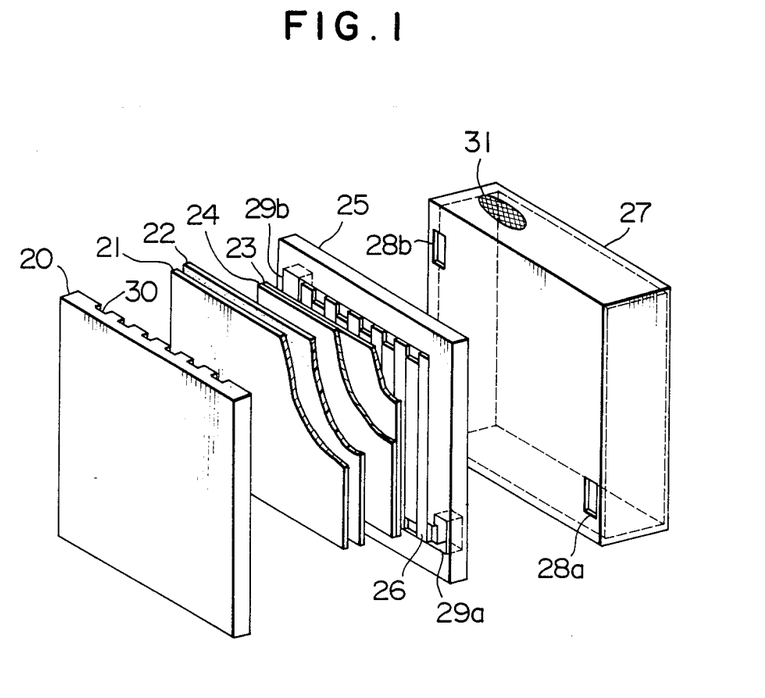
FIG. 1 is an exploded perspective view showing a unit cell in an embodiment of the fuel cell according to the present invention.

It is apparent from the above discussion that employment of a solid electrolyte and fuel supply according to the sucking mode are most desirable in the fuel cell of the present invention. The present invention will be apparent from the following detailed description taken in conjunction with the accompanying drawings, in which:

FIG. 1 is an exploded perspective view showing the structure of a unit cell in an embodiment of the methanol-air fuel cell according to the present invention.

Referring to FIG. 1, the unit cell is composed by successively superposing a separator 20 of graphite serving as both an air chamber and a current collector, an air electrode 21 disposed adjacent to the separator 20, an ion exchange membrane 22, an organic high-molecular electrolyte layer 24 disposed adjacent to a methanol electrode 23, and another separator 25 of graphite serving as both a fuel chamber and a current collector. Grooves 30 are formed on one surface of the separator 20 to provide air passages. The methanol electrode 23 and air electrode 21 are provided by blending particles of a catalytic, active noble metal such as platinum with conductive particles such as particles of carbon black or acetylene black, and coating the blend on a conductive base member such as a carbon paper or a wire gauze of a metal showing a corrosion resistance against acids or alkalis. The blend containing the catalytic active component is provided at least on the electrolyte-side surface of the methanol electrode 23 and air electrode 21.

In the embodiment shown in FIG. 1, the separator 25 is provided with a plurality of sucking strips 26 for sucking methanol supplied from a methanol tank 27 to the fuel chamber 25. The methanol tank 27 is disposed in contact with the other surface of the separator 25 remote from the surface facing the methanol electrode 23. Holes 28a and 28b are provided at diagonally lower and upper positions respectively on the wall of the methanol tank 27 making contact with the separator 25. Holes 29a and 29b are also provided in the separator 25 at positions corresponding to those of the holes 28a and 28b respectively. These holes serve as passages for supplying methanol and also as passages for discharging gas produced at the methanol electrode 23. The level of methanol contained in the methanol tank 27 is lower than the position of the hole 28b in the state shown in FIG. 1. In the state shown in FIG. 1, methanol contained in the methanol tank 27 flows out from the hole 28a to enter the fuel chamber 25 through the hole 29a and is sucked by the sucking strips 26 to be charged up to the upper part of the fuel chamber. Gas produced at the methanol electrode 23 as a result of the electrochemical reaction flows out from the hole 29b to enter the methanol tank 27 through the hole 28b and is vented to the exterior of the fuel cell through a gas vent port 31 having gas-liquid separating means. In addition to the illustrated gas vent port 31 provided on the top wall of the methanol tank 27, another gas vent port (not shown) is also provided on the bottom wall of the methanol tank 27 at a position diagonal with respect to the former.

The structure of the fuel cell does not change from that shown in FIG. 1 even when the attitude of the fuel cell is changed over an angle of 180° from that shown in FIG. 1. Now, methanol flows out from the hole 28b to enter the fuel chamber through the hole 29b, and gas produced at the methanol electrode 23 flows out from the hole 29a to enter the methanol tank 27 through the hole 28a and is vented to the exterior of the cell through the gas vent port (not shown) provided on the bottom wall of the methanol tank 27 in FIG. 1.

Even when the attitude of the fuel cell is changed over an angle of 90° from that shown in FIG. 1, the holes serving as the gas vent passage are present at the upper part of the methanol tank 27 and fuel chamber, and the holes serving as the fuel supply passage are present at the lower part of the methanol tank 27 and fuel chamber. Therefore, the fuel cell can satisfactorily operate at whatever attitude while reliably venting produced gas to the exterior of the cell.

The embodiment shown in FIG. 1 is advantageous over the prior art methanol fuel cell in that an auxiliary unit such as a pump for supplying and circulating anolyte is unnecessary. Thus, the power required for driving this pump can be saved.

Figure 2:
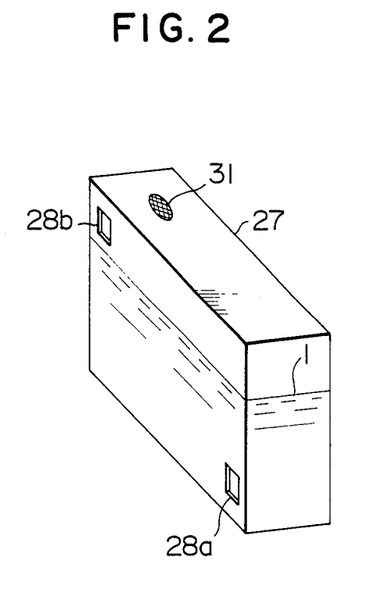
FIG. 2 is a perspective view schematically showing the level of fuel contained in the fuel tank shown in FIG. 1.

FIG. 2 shows schematically the state of methanol 1 contained in the methanol tank 27 shown in FIG. 1. It is required that the level of the methanol 1 be lower than the level of the hole 28b. The internal zone of the methanol tank 27 where the methanol 1 is not charged is utilized as an accumulator for the produced gas which is to be vented to the exterior of the cell from the gas vent port 31.

Figure 3:
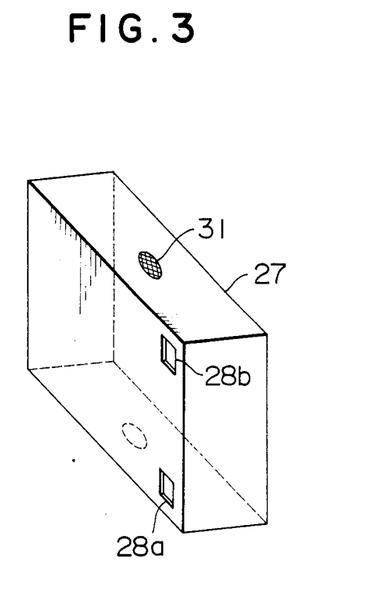
FIG. 3 is a perspective view showing another form of the fuel tank.

FIG. 3 shows a modification of the methanol tank 27 shown in FIG. 1. In this modification, the holes 28a and 28b are provided in vertically aligned relation adjacent to one of the marginal edges of the separator-side wall of the methanol tank 27. These holes 28a and 28b may be extended toward each other to provide an elongate vertical hole.

In the fuel cell provided with the modified methanol tank 27 shown in FIG. 3, methanol is supplied to the fuel chamber from the methanol tank 27 on the side which is the same as the side from which gas produced at the methanol electrode 23 is discharged into the methanol tank 27.

Thus, although the fuel cell can satisfactorily operate at the attitude of the methanol tank 27 shown in FIG. 3 or at a 180°-turned attitude, the fuel cell is not suitable for operation at a 90°-turned attitude of the methanol tank 27. Therefore, the satisfactorily operable attitude of the fuel cell provided with the modified methanol tank 27 shown in FIG. 3 is restricted when compared with that provided with the methanol tank 27 shown in FIG. 1.

However, the fuel cell provided with the modified methanol tank 27 is advantageous in that the overall size of the fuel cell can be made small because both the methanol supply system and the gas vent system are disposed adjacent to one of the marginal edges of the separator-side wall of the methanol tank.

In the modified methanol tank 27 shown in FIG. 3, the gas vent ports 31 need not necessarily be provided at diagonal positions and may be provided at opposing or vertically aligned positions on the top and bottom walls respectively of the methanol tank 27 as illustrated. In another form, the gas vent ports 31 may be provided in vertically spaced relation on one of the side walls of the methanol tank 27 except the wall making contact with the fuel chamber.

Figure 4:
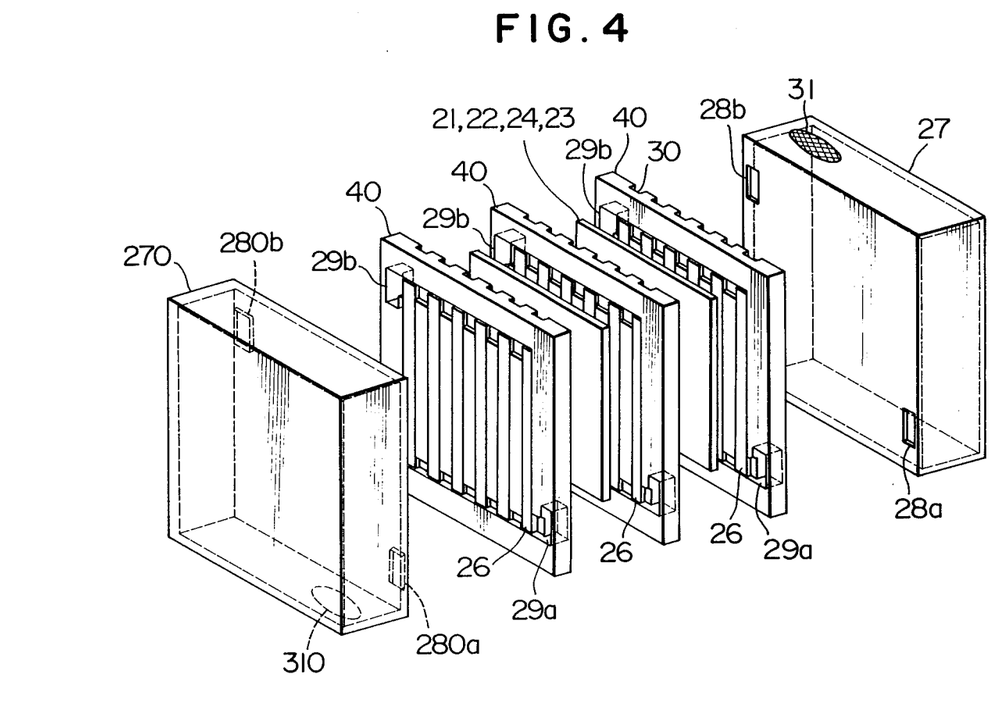
FIG. 4 is an exploded perspective view of another embodiment of the fuel cell of the present invention comprising a plurality of stacked or laminated unit cells.

FIG. 4 shows another embodiment of the fuel cell of the present invention in which a plurality of unit cells are connected in series with each other, and methanol tanks are provided on the both ends respectively of the laminate. In FIG. 4 in which the same reference numerals are used to designate the same or equivalent parts appearing in FIG. 1, the methanol electrode, electrolyte layer, ion exchange membrane and air electrode are shown by a single plate to avoid confusion of illustration. The fuel chamber and air chamber are formed on the respective surfaces of each of common separators 40 of graphite. That is, grooves 30 are formed on one of the surfaces of each of the separators 40 of graphite to provide air passages, and a recess is formed on the other surface to receive the fuel sucking strips 26 therein.

By the lamination of the plural unit cells, the holes 29a and 29b provided on the individual separators 40 communicate with each other to provide the passage for supplying methanol from the methanol tanks 27 and 270 to the fuel chambers and also to provide the passage for discharging gas produced at the methanol electrodes 23.

When the parts of the individual unit cells are formed to include these passages or when a frame member of, for example, a plastic material including those passages is separately molded and the components of the individual unit cells are inserted in the molded frame member, a fuel cell which is structurally compact can be assembled.

It is preferable that, after lamination of the plural unit cells, end plates are put on both sides of the laminate and fastened by fastening members such as bolts so that the contact resistance between the laminated unit cells may not become high. Alternatively, the components of the individual unit cells may be bonded and fixed together by an adhesive.

Referring to FIG. 4, the methanol tanks 27 and 270 are provided on both sides of the laminated unit cells to sandwich the laminate therebetween, and gas vent ports 31 and 310 are provided on the top wall of the fuel tank 27 and on the bottom wall of the other fuel tank 270 respectively. These gas vent ports 31 and 310 are disposed at diagonal positions as shown. One or both of these gas vent ports 31 and 310 may be arranged to be removable so as to replenish fuel therefrom.

Provision of such two methanol tanks 27 and 270 as shown in FIG. 4 is advantageous in that a single fuel tank of large capacity need not be provided when operation of the fuel cell for a long period of time is required, and a fuel tank of large capacity must be used. Further, one or both of these two fuel tanks are preferably of the cartridge type so that, with the consumption of fuel contained in the tank, the tank can be replaced by a new one to re-raise the level of fuel. In such a case, however, means must be provided so that, when the fuel tank is detached from the fuel cell, methanol present in the fuel cell or the methanol remaining in the fuel tank may not leak out from the connection therebetween. As this preventive means, gas-liquid separating means similar to that provided in the gas vent port are preferably provided on the fuel cell and fuel tank or tanks adjacent to the connection or connections.

In the fuel cell shown in FIG. 4, methanol is supplied from the fuel tanks 27 and 270 to the fuel chambers through the respective holes 28a and 280a. On the other hand, gas produced at the methanol electrodes 23 flows through the holes 29b and 28b to accumulate in the internal space of the methanol tank 27 not charged with the fuel and is then vented to the exterior of the fuel cell from the gas vent port 31.

The fuel cell having the structure shown in FIG. 4 can satisfactorily operate and gas produced at the methanol electrodes can be vented to the exterior of the fuel cell even when its attitude charge brings the methanol tank 27 to an upper position relative to the methanol tank 270 and vice versa.

Further, the fuel is supplied to the fuel chambers only through the holes bored in the separators 40, and the fuel is charged into the fuel chambers even in the non-operating period of the fuel cell. Therefore, supply of an oxidizing agent to the oxidizer chambers can immediately initiate generation of the power thereby ensuring quick starting of the fuel cell operation.

Figure 5:
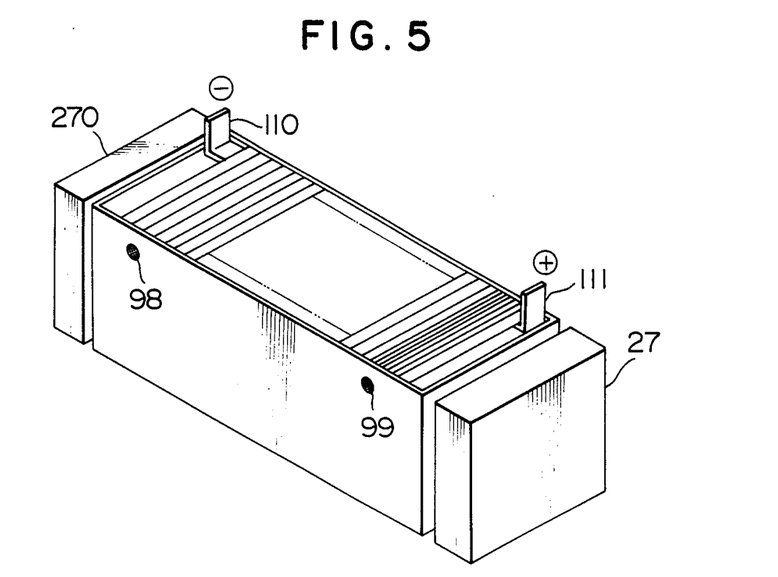
FIG. 5 is a perspective view of still another embodiment of the layer-built type fuel cell according to the present invention.

FIG. 5 shows still another embodiment of the fuel cell of the present invention in which a plurality of unit cells are laminated in series with each other, and methanol tanks are provided on the both ends respectively of the laminate. In this embodiment, gas vent ports 98 and 99 are not provided on the methanol tanks 27 and 270 but are provided on the separators of graphite (not shown), so that produced gas can be vented to the exterior of the fuel cell at positions midway of the passages supplying methanol to the fuel chambers from the methanol tanks. Such gas vent ports are also provided at lower positions on the other side of the fuel cell.

Thus, gas produced at the fuel electrodes can be effectively vented to the exterior of the fuel cells even when the gas vent ports are provided midway of the fuel supply passages. In FIG. 5, reference numerals 111 and 112 designate terminals.

Figure 6:
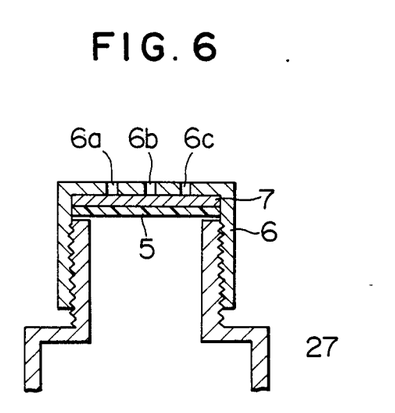
FIG. 6 is a sectional view showing one form of the structure of the gas vent port employed in the present invention.

FIG. 6 shows one form of the structure of the gas vent port in the present invention. Although FIG. 6 illustrates the case where the gas vent port is disposed on the top wall of the methanol tank 27, it is apparent that the structure is the same when the gas vent port is disposed on the bottom wall of the methanol tank 27, and it is also apparent that the same applies to the case where the gas vent port is disposed on the separator.

The requirements for the gas vent port are that no leakage of fuel occurs even when the attitude of the fuel cell makes a turn of 180° or 90° from that shown in FIG. 1 or FIG. 4 and that gas produced at the fuel electrode can be vented to the exterior of the fuel cell even after impartation of the liquid pressure.

To satisfy the above requirements, it is necessary to provide gas-liquid separating means in the gas vent port. Preferred gas-liquid separating means is provided by a porous sheet or a very thin film of thickness less than 50 $\mu$m obtained by pressing under heat an entwined mass of fibers of a liquid repellent material such as a fluoro carbon resin, polystyrene or polyethylene.

However, when such a sheet or film is singly used, it is easily damaged by the liquid pressure due to its low mechanical strength. A structure as shown in FIG. 6 is therefore desirable.

Referring to FIG. 6, a porous film 5 of a liquid repellent material as described above is reinforced by a cap 6 made of a material which is strong enough to withstand the liquid pressure. The cap 6 is formed with a plurality of perforations 6a, 6b and 6c permitting flow of gas therethrough. The material of the cap 6 is, for example, the same as that of the methanol tank 27. In the form shown in FIG. 6, the cap 6 is screwed onto a mating tap of the tank 27 so that it serves also as a fuel inlet to the tank 27.

A porous reinforcement 7 is preferably interposed between the cap 6 and the liquid-repellent porous film 5 so as to minimize the possibility of rupture of the liquid-repellent porous film 5.

Figure 7:
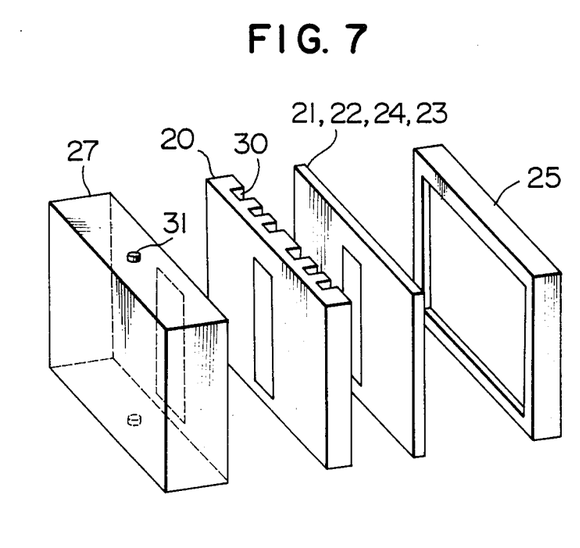
FIG. 7 is an exploded perspective view of yet another embodiment of the present invention to illustrate how fuel is supplied and gas is vented.

FIG. 7 shows yet another embodiment of the fuel cell of the present invention in which a combined fuel passage and gas vent passage extends through the central area of the methanol electrode or air electrode.

Such an arrangement is advantageous in that the path for supplied fuel and vented gas in the fuel chamber can be shortened.

Figure 8:
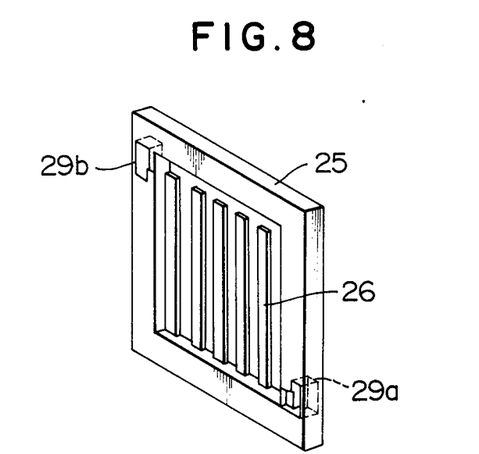
FIG. 8 is a perspective view showing the structure of the fuel chamber employed in the present invention. Preferred embodiments of the present invention will now be described in detail with reference to the drawings.

FIG. 8 shows one form of the structure of the fuel chamber employed in the present invention. The fuel chamber may be such that a fuel receiving recess is merely formed on a liquid impermeable plate of carbon. It is desirable, however, that a liquid receiving recess is formed on a liquid impermeable plate of carbon, and sucking strips 26 are disposed in this recess as shown in FIG. 8. By the provision of such sucking strips 26, fuel can make contact with the entire surface of the fuel electrode.

While preferred embodiments of the present invention have been described in detail with reference to the drawings, the present invention is in no way limited to such specific embodiments, and various changes and modifications may be made therein without departing from the scope of appended claims.

For example, the present invention is also applicable to liquid fuel cells other than the methanol fuel cell, and methanol tanks may be disposed on lateral sides of the fuel chambers in the fuel cell structure shown in FIG. 4.

It will be understood from the foregoing detailed description that the liquid fuel cell according to the present invention can reliably generate power at whatever attitude, and produced gas only can be vented to the exterior of the fuel cell without causing leakage of fuel. Further, supply of an oxidizing agent to the oxidizer chambers can cause quick starting of the fuel cell.

We claim:

1. A liquid fuel cell including a fuel electrode and an oxidizer electrode disposed opposite to each other with an electrolyte layer being interposed therebetween, a fuel chamber disposed adjacent to said fuel electrode, an oxidizer chamber disposed adjacent to said oxidizer electrode, and a fuel tank supplying liquid fuel to said fuel chamber, said fuel cell comprising a first passage connecting between a non-charged space in said fuel tank and said fuel chamber, a second passage disposed at a position diagonal with respect to said first passage for supplying said fuel from said fuel tank to said fuel chamber, and gas venting ports provided with gas-liquid separating means and disposed on at least one of said non-charged space of said fuel tank and said first passage communicating therewith and also disposed on at least one of the fuel-charged space of said fuel tank and said second passage communicating therewith.

2. A liquid fuel cell as claimed in claim 1, wherein said gas vent ports are disposed at diagonally upper and lower positions respectively on said fuel tank.

3. A liquid fuel cell including a plurality of series-connected unit cells each including a fuel electrode and an oxidizer electrode disposed opposite to each other with an electrolyte layer being interposed therebetween, a fuel chamber disposed adjacent to said fuel electrode, and an oxidizer chamber disposed adjacent to said oxidizer electrode, and a fuel tank supplying liquid fuel to said fuel chambers, said fuel cell comprising a passage connecting between a non-charged space in said fuel tank and said fuel chambers of said unit cells, and gas venting means including a gas vent port provided with gas-liquid separating means and disposed on at least one of said passage and said non-charged space of said fuel tank, said gas venting means including at least two gas vent ports so that gas can be vented from one of said gas vent ports when the attitude of the fuel cell tilts over an angle of more than 45° from the normal attitude.

4. A liquid fuel cell as claimed in claim 3, wherein a second passage is disposed at a diagonally lower position than the position of said first passage for supplying liquid fuel contained in said fuel tank to all of said fuel chambers of said unit cells.

5. A liquid fuel cell as claimed in claim 4, wherein a gas vent port provided with gas-liquid separating means is disposed in said second passage.

6. A liquid fuel cell as claimed in claim 5, wherein said gas-liquid separating means is in the form of a porous member of a liquid repellent material.

7. A liquid fuel cell as claimed in claim 4, wherein a gas vent port provided with gas-liquid separating means is disposed in the fuel-charged space of said fuel tank.

8. A liquid fuel cell as claimed in claim 7, wherein said gas vent port is disposed at a position diagonal with respect to another gas vent port disposed on at least one of said non-charged space on said fuel tank and said first passage communicating with said non-charged space.

9. A liquid fuel cell as claimed in claim 7, wherein said gas vent port is disposed at a position associated with said non-charged space when said fuel tank is turned 180°.

10. A liquid fuel cell as claimed in claim 3, wherein fuel sucking means is provided in said fuel chamber of each of said unit cells.

11. A liquid fuel cell as claimed in claim 10, wherein said electrolyte is a solid electrolyte.

12. A liquid fuel cell as claimed in claim 11, wherein said liquid fuel is methanol.

13. A liquid fuel cell as claimed in claim 3, wherein said fuel chamber of each of said unit cells is provided by forming a recess on a separator of carbon.

14. A liquid fuel cell as claimed in claim 13, wherein said separator of carbon is provided with a passage connecting between the non-charged space of said fuel tank and said fuel chamber.

15. A liquid fuel cell as claimed in claim 13, wherein said separator of carbon is provided with another passage for supplying liquid fuel contained in said fuel tank to said fuel chamber.

16. A liquid fuel cell including a plurality of series-connected unit cells each including a fuel electrode and an oxidizer electrode disposed opposite to each other with an electrolyte layer being interposed therebetween, a fuel chamber disposed adjacent to said fuel electrode, and an oxidizer chamber disposed adjacent to said oxidizer electrode, and fuel tanks supplying liquid fuel to said fuel chambers, wherein said fuel tanks are disposed on both ends respectively of the laminate of said series-connected unit cells, and wherein said fuel cell comprises a passage connecting between at least one of non-charged spaces of said fuel tanks and said fuel chambers, and gas venting means including gas vent ports provided with gas-liquid separating means and disposed on at least one of said passage and said non-charged space of said fuel tank communicating with said passage, said gas venting means including at least two gas vent ports disposed at different positions respectively so that gas can be vented from one of said gas vent ports when the attitude of the fuel cell tilts over an angle of more than 45° from the normal attitude.

17. A liquid fuel cell as claimed in claim 16, wherein a second passage connecting between at least one of the fuel-charged spaces in said two fuel tanks and said fuel chambers is disposed at a diagonal position with respect to said first passage connecting between said non-charged space and said fuel chambers.

18. A liquid fuel cell as claimed in claim 17, wherein a gas vent port provided with gas-liquid separating means is disposed on at least one of said second passage and said non-charged space of said fuel tank communicating with said second passage.

19. A liquid fuel cell as claimed in claim 17, wherein said gas venting means are provided in the upper non-charged space of one of said fuel tanks and in the lower fuel-charged space of the other fuel tank respectively at positions diagonal with respect to each other.

20. A liquid fuel cell as claimed in claim 16, wherein said gas vent ports are disposed at diagonally upper and lower positions of said fuel tanks respectively.

21. A liquid fuel cell as claimed in claim 16, wherein the volume of one of said fuel tanks is more than two to five times as large as that of the other.

22. A liquid fuel cell including a fuel electrode and an oxidizer electrode disposed opposite to each other with a liquid-fuel impermeable electrolyte layer being interposed therebetween, a fuel chamber disposed adjacent to said fuel electrode, an oxidizer chamber disposed adjacent to said oxidizer electrode, and a fuel tank supplying liquid fuel to said fuel chamber, wherein at least two passages are provided so that fuel can be supplied from said fuel tank to said fuel chamber through a second passage when the attitude of the fuel cell tilts over an angle of more than 45° from the normal attitude and fuel cannot be supplied through a first passage normally connecting between said fuel tank and said fuel chamber, said first and second passages cooperating to continuously charge fuel in said fuel chamber to ensure quick starting in response to the supply of an oxidizing agent to said oxidizer chamber, and means is provided for venting gas produced at said fuel electrode to the atmosphere.

* * * * *